United States Patent [19]
Mills

[11] 3,822,694
[45] July 9, 1974

[54] METHOD OF MONITORING MANDIBULAR POSITIONS AND MOVEMENTS

[75] Inventor: Gordon E. Mills, Lynnwood, Wash.

[73] Assignee: Bernard Jankelson, Seattle, Wash.

[22] Filed: Oct. 24, 1972

[21] Appl. No.: 300,421

[52] U.S. Cl.................................. 128/2 S, 32/19
[51] Int. Cl............................................. A61b 5/10
[58] Field of Search.................... 128/2 S, 2 N, 2 R; 32/19–21, DIG. 6

[56] References Cited
UNITED STATES PATENTS

| | | | |
|---|---|---|---|
| 3,547,106 | 12/1970 | Bornmann | 128/2 S |
| 3,610,227 | 10/1971 | Griffin | 128/2 S |
| 3,768,459 | 10/1973 | Cannon et al. | 128/2 S |

FOREIGN PATENTS OR APPLICATIONS

| | | | |
|---|---|---|---|
| 232,447 | 9/1969 | U.S.S.R. | 128/2 S |

OTHER PUBLICATIONS
New England Journ. of Med., Oct. 16, 1958, Vol. 259, No. 16, pp. 761–764.
Med. & Biol. Engin., Vol. 6, 1968, pp. 677–679.

*Primary Examiner*—Kyle L. Howell

[57] ABSTRACT

A method of monitoring mandibular movements whereby a permanent magnet is secured to the mandible and one or more fluxgate magnetometers are located relative to the permanent magnet so as to sense changes in magnetic field which result from mandibular movement. The outputs of the fluxgate magnetometers are linearized, if necessary, and then recorded to provide an indication of mandibular movement in one or more planes. The output from the magnetometers may be differentiated by associated electronics to provide an indication of velocity and/or acceleration of the mandible during closure.

9 Claims, 2 Drawing Figures

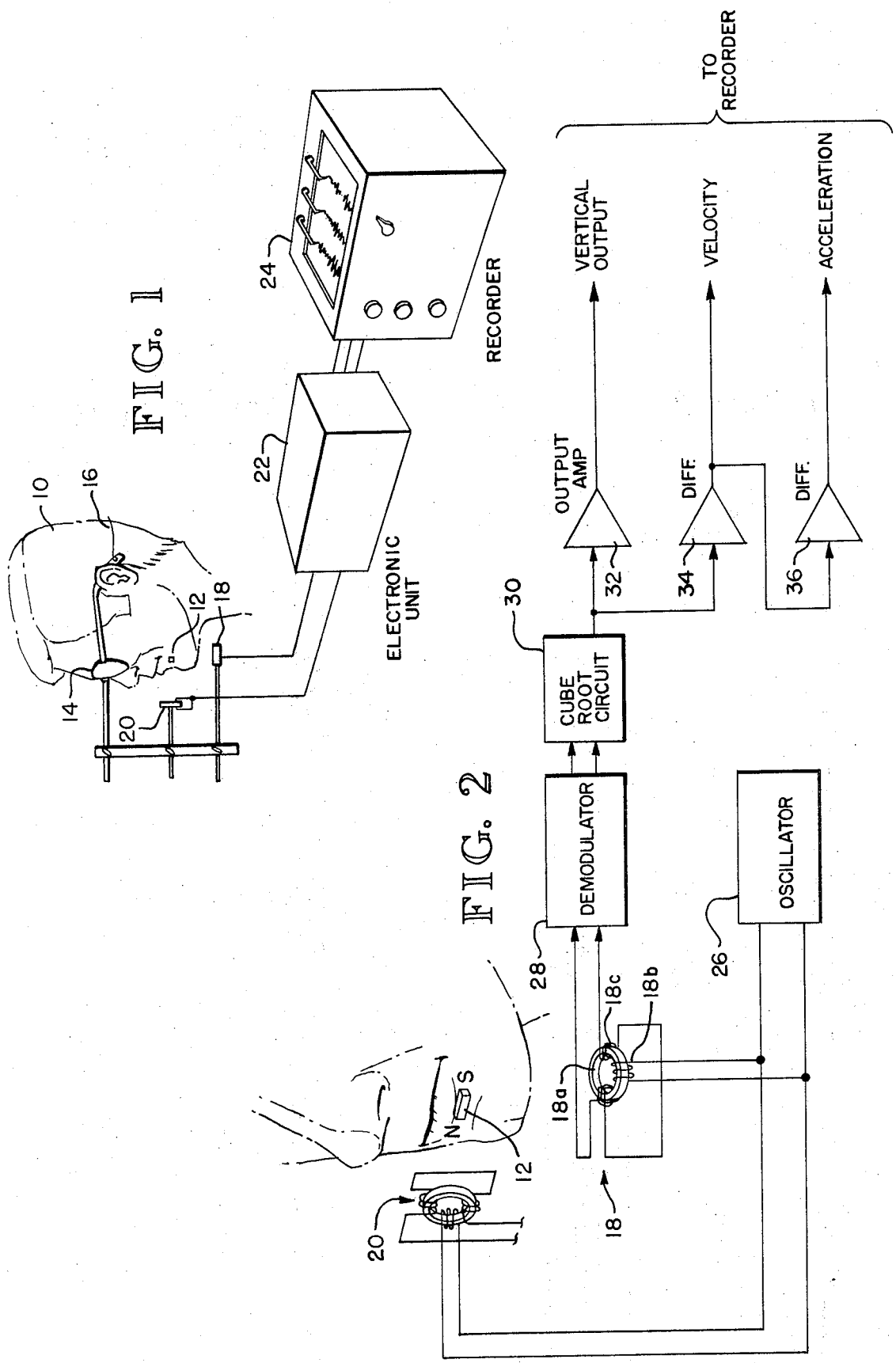

METHOD OF MONITORING MANDIBULAR POSITIONS AND MOVEMENTS

BACKGROUND OF THE INVENTION

1. Field of the Invention

This invention relates to medical instrumentation. More specifically, the invention relates to a method of monitoring mandibular movement.

2. Prior Art Relating to the Disclosure

There has long been a demonstrated need for an acceptable method of monitoring mandibular movement, both as an aid to improved understanding of the mechanics of occlusion as well as a diagnostic tool for the practicing dentist for use in analyzing and correcting occlusion problems. The dental profession has long been aware of two intercuspal positions for the dentition, the posterior (or "hinge") position and the centric occlusion position, also known as the habitual, convenience or maximum intercuspation position. The posterior position is generally accepted as the ideal intercuspation position but it is also generally acknowledged that the posterior position, in an overwhelming percentage of the population, does not coincide with the centric occulsion position. Though closure into the centric occlusion position is generally considered to be a defect to the extent that it does not coincide with the posterior position, there has been little experimental investigation to determine the function position of occlusion during swallowing in order to evaluate the validity of either the posterior or centric occlusion positions in relation to function. The lack of such experimental investigation is due primarily to a lack of an acceptable method of monitoring mandibular movement without interfering with normal mandibular function.

In addition to a demonstrated need as a research tool, there is also a need for an acceptable method of monitoring mandibular movement for the practicing dentist in his analysis and correction of occlusion problems. An acceptable method of monitoring mandibular movement would allow the practitioner to determine the stability of occlusion before and after treatment and to measure and locate any abnormal tooth displacement during occlusion.

Prior art attempts to monitor mandibular movement have suffered from three principal defects. Early attempts to determine tooth contact required large bulky devices which tended to interfere with normal mandibular movement and thereby distort the analytical process. With the advent of miniaturized devices this problem has been alleviated in certain proposals but such proposals have been limited to methods of monitoring which require individually built-in installations of monitoring equipment which are time consuming, expensive and require extreme care and skill in coordinating metallic contact points. The necessity for involved special installation of built-in equipment of an essentially permanent nature drastically reduced the practical utility of such proposals.

Finally, prior art methods of monitoring mandibular movement were limited to the determination of tooth contact during occlusion since they relied upon the physical closure of mechanical contacts. Such methods were unable to relay other important information about mandibular movement such as the velocity of the mandible, the general direction of mandibular movement and other relevant indicia of mandibular mechanics.

SUMMARY OF THE INVENTION

It is an object of the present invention to provide an improved method of monitoring mandibular movement which does not require essentially permanent installation of the monitoring equipment.

It is a still further object of the present invention to provide an improved method of monitoring mandibular movements which does not interefer with normal mandibular movement.

It is yet a further object of the present invention to provide an improved method of monitoring mandibular movement which allows for the measurement of other aspects of mandibular mechanics in addition to tooth closure.

Briefly stated, the present invention accomplishes these and other objects by securing a source of magnetic flux to the mandible and measuring variations in flux during mandibular movements, said measurement of flux being accomplished by some type of field measuring device or devices located at some fixed relationship to the mandible.

BRIEF DESCRIPTION OF THE DRAWINGS

FIG. 1 is a graphic illustration of a patient during measurement of mandibular movements according to the method of the present invention; and FIG. 2 is an electronic block diagram further illustrating the method of the present invention.

DESCRIPTION OF THE PREFERRED EMBODIMENTS

In FIG. 1 there is shown a representation of a patient 10 and associated apparatus for carrying out the method of measuring mandibular movement according to the present invention. The method begins by securing a source of magnetic flux, such as a small permanent magnet 12, to the mandible of the patient. The magnet may be secured in any satisfactory fashion so as to avoid interference with closure, chewing, etc. One acceptable method of securing the magnet 12 is to locate it between the lower lip and the mandible at approximately the gum line using dental impression wax of other suitable material to assure that the magnet is securely attached to the mandible.

The patient is then affixed with one or more magnetic field measuring devices. The field measuring devices may be secured to the patient's head by some type of harness such as illustrated by a conventional pair of eyeglasses 14 secured with a band 16 at the rear to guard against movement.

A first field measuring device such as a fluxgate magnetometer 18 is located below the patient's chin to measure changes in magnetic flux in the vertical plane. The use and operation of this particular type of field measuring device will be explained in greater detail hereinafter with reference to FIG. 2 but for the moment it suffices to say that magnetometer 18 operates to detect variations in magnetic field in the vertical plane and thereby monitor the vertical movements of the mandible during chewing, closure, manipulation of the mandible, etc.

A second magnetic field measuring device such as fluxgate magnetometer 20 is located anteriorly of the location of the magnet 12 in the horizontal plane. Magnetometer 20 measures variations in the magnetic field in the horizontal plane and thereby indicates the nature of any anterior-posterior movements of the mandible in order to indicate any instability in that plane, sliding of the teeth during closure, etc.

The two magnetometers 18, 20 operate to sense the changes in magnetic flux from the magnet 12 which occur during mandibular movement. The magnetometers are, in turn, connected to an appropriately designed electronic unit 22, shown in more detail in FIG. 2. The electronic unit 22 operates to linearize the output of the magnetometers 18, 20 and otherwise condition their output signals for subsequent recordation and analysis.

Finally, the output of the electronic unit 22 is connected to a multiple channel recorder 24 for recording the desired information derived during mandibular movement. Since the magnetometers 18, 20 will "track" the movements of the mandible in the horizontal and vertical axes it is possible to generate a variety of information about mandibular mechanics including velocity, acceleration, "bounce", etc. The choice of information to be generated and subsequently recorded will depend largely upon the uses of the instruments and the desires of the practicioner. Another magnetic field sensing device may be placed laterally of the magnet 12 to monitor lateral movements of the mandible.

Turning now to FIG. 2, there is shown a somewhat more detailed block diagram of the electronic unit utilized in carrying out the method contemplated by the present invention. The patient 10 is shown in a cross-sectional cutaway so as to more accurately show the location of the magnet 12 which is secured to the mandible at approximately the level of the gum. Although a variety of magnets are possible, the magnet used should be small, such as a one-fourth inch by one-half inch by one-eighth inch Alnico magnet, and as powerful as possible. The magnet is preferably arranged as shown in FIG. 2 with the poles aligned parallel to the gum line. Securing the magnet to the mandible can be done in any fashion which assures that the magnet moves with the mandible and at no other time. A small quantity of wax material used by dentists for taking impressions can be inserted between the lower lip and the mandible and the magnet impressed therein. Alternatively, some form of fixture or the like can be used to secure the magnet via the lower teeth. In any event, securing the magnet in any fashion will suffice so long as the method used does not interfere with normal mandibular movements.

The fluxgate magnetometers 18 and 20 are shown in detail in FIG. 2. In addition, the electronics for demodulating and linearizing the output of the magnetometer 18 are shown in block diagram form with the understanding that the electronics associated with magnetometer 20 may be similar.

Fluxgate magnetometer 18 includes a core 18a, an excitation winding 18b and an output winding 18c. The theory and details of operation for magnetometers of this type are well known. For the purposes of the present invention it suffices to note that the magnetometer 18 has an excitation signal, such as a 4 kilohertz square wave from oscillator 26 applied at its excitation winding 18b. The signal present on the output winding 18c will vary as a function of the magnitude of the external field applied thereto. The sensitive axis of the magnetometer is approximately along a line parallel to the plane of the core and perpendicular to a line joining the two output windings 18c. As the external field applied varies, one side of the core will saturate before the other resulting in a series of pulses on the output winding 18c. The magnitude of these pulses is approximately directly proportional to the external magnetic field applied to the magnetometer.

The output of the magnetometer from output winding 18c is connected to a demodulator circuit 28. The demodulator circuit 28 converts the output to a D.C. signal whose magnitude is proportional to the output of the magnetometer and, therefore, proportional to the external magnetic field applied to the magnetometer.

At this point it will be obvious that the output of the demodulator circuit 28 will vary as the mandible moves. When the mouth opens, the mandible moves downward. This places the magnet 12 in closer relation to the magnetometer 18, thus increasing the strength of the external field applied to the magnetometer. The increasing field increases the d.c. output from the demodulator circuit 28. However, the output of the demodulator circuit 28 is not a linear function of mandible movement since the strength of the external field does not vary directly with the physical distance between the magnet 12 and the magnetometer 18. Instead, the field strength varies approximately inversely with the third power of the distance. That is, the distance between the magnet 12 and the magnetometer 18 is a function of the approximate cube root of the field strength.

Because the distance and field strength do not vary in a linear fashion, it may be necessary to linearize the output of the magnetometer 18. In certain uses of the method of the present invention, it will be apparent that linearization is not necessary. That is, if the present method is used only to determine tooth closure, linearization is unnecessary.

Where a linear output signal is desired, the output of the demodulator circuit 28 is connected to a cube root circuit 30. The particular form of the cube root circuit is not essential to the method of the present invention and will vary depending upon the nature of other components in the electronic unit. One type of cube root circuit which can be used is an operational amplifier having variable gain such as that obtained when a varistor is used in the amplifier's feedback circuit.

The output of the cube root circuit 30 will be a linear signal indicative of the actual physical distance between the magnet 12 and the magnetometer 18. This signal is fed through an output amplifier 32 for gain and isolation purposes. At this point in the circuit, the signal may be connected to an appropriate recorder, oscillograph, oscilloscope, or other data recording means for storage and analysis. The signal thus stored amounts to an accurate record of the vertical position of the mandible during mandibular movements.

In addition to the actual track of the mandible movement, other information about mandibular movements can be generated as shown. If, for example, one is interested in analyzing the vertical velocity of the mandible, it is necessary only to differentiate the output of the cube root circuit 30 with an operational amplifier 34 connected to differentiate.

Finally, valuable information about mandibular mechanics can be ascertained by studying the rate at which the mandible decelerates during closure. This information can be readily obtained with another differentiating amplifier 36 connected to the output of amplifier 34.

The embodiments of the invention in which an exclusive property or privilege is claimed are defined as follows:

1. A method of monitoring mandibular position and movement comprising the steps of:
   a. securing a source of magnetic field to the mandible;
   b. locating a magnetic field measuring device providing a signal proportional to the magnetic flux level at the field measuring device in proximity to the source of magnetic field; and
   c. monitoring the position of the source of the magnetic field by the signal output of the magnetic field measuring device during mandibular movement.

2. The method recited in claim 1 wherein the step of securing a source of magnetic field to the mandible comprises the step of securing a permanent magnet to the mandible.

3. The method recited in claim 2 wherein the step of locating a magnetic field measuring device in proximity to the source of magnetic field comprises the step of locating a fluxgate magnetometer in proximity to the permanent magnet.

4. The method recited in claim 3 wherein the step of locating a magnetic field measuring device in proximity to the source of magnetic field comprises the steps of locating a first magnetic field measuring device to measure changes in the magnetic flux in a vertical plane relative to the source of magnetic field to monitor vertical position and movement of the mandible and locating a second magnetic field measuring device to measure changes in the magnetic flux in a horizontal plane relative to the source of magnetic field to monitor anterior-posterior position and movement of the mandible.

5. The method of claim 4 wherein one or more third magnetic field measuring devices are located in proximity to the source of magnetic field to measure changes in the magnetic flux in a plane perpendicular to the vertical and horizontal planes relative to the source of magnetic field to monitor lateral position and movement of the mandible.

6. A method of monitoring mandibular position and movement comprising the steps of:
   a. securing a permanent magnet to the mandible;
   b. locating a first magnetic field measuring device to measure changes in the magnetic flux in a vertical plane relative to the source of magnetic field;
   c. locating a second magnetic field measuring device to measure changes in the magnetic flux in a horizontal plane; and
   d. monitoring the outputs of the first and second field measuring devices during mandibular movement.

7. The method recited in claim 6 wherein the step of monitoring the outputs of the first and second field measuring devices comprises the steps of linearizing the output of the first field measuring device and recording the linearized output as an indicia of mandibular movement in one axis and linearizing the output of the second field measuring device and recording the linearized output as an indicia of mandibular movement in a second perpendicular axis.

8. The method recited in claim 7 wherein the linearized output of one of the field measuring devices is differentiated twice so as to produce a signal indicative of the acceleration of the mandible.

9. The method of claim 6 wherein one or more third magnetic field measuring devices are located in proximity to the source of magnetic field to measure changes in the magnetic flux in a plane perpendicular to the vertical and horizontal planes relative to the source of magnetic field to monitor lateral position and movement of the mandible.

* * * * *